3,160,609
PREPARATION OF POLYESTERAMIDES WITH TETRAPHENYL TIN CATALYST
Nicholas R. Congiundi and Lloyd T. Jenkins, Cary, N.C., assignors, by mesne assignments, to Monsanto Company, a corporation of Delaware
No Drawing. Filed Mar. 12, 1962, Ser. No. 179,181
8 Claims. (Cl. 260—75)

This invention is addressed to the general subject matter of polyester amide preparations. More particularly, it is concerned with an improved method for obtaining polyesteramides by poly-condensing terephthalic acid diamide-N,N'-di-ε-caproic acid or its ester derivatives with a glycol in the presence of a novel catalyst.

It is known that a superior polyesteramide can be prepared from terephthalic acid diamide-N,N'-di-ε-caproic acid or its ester derivatives and ethylene glycol. However, previously known procedures for preparing these polymers have not been economic and the polymers obtained therefrom have been greatly discolored. These shortcomings have been for the most part due to the unavailability of efficient catalysts for use in forming these polymers. Despite the fact that a reaction somewhat analagous to polyesterification is involved, it has been found that conventional catalysts, such as manganese formate, are not active in reactions for producing the aforesaid polymers, although they are highly effective in forming polyesters from, for example, terephthalic acid and ethylene glycol. Catalysts, such as lead oxide, boron and others have been previously employed in forming the polyesteramides to which this invention is addressed, but they have not possessed the necessary activity for satisfactory results. That is, when employed, the polymerization reaction, which is conducted at high temperatures, must be so prolonged in order to obtain the desired degree of polymerization for polymers having fiber-forming characteristics that the polymers become degraded and develop undesirable color.

Accordingly, it is an object of this invention to provide an improved process for preparing polyesteramides from terephthalic acid diamide-N,N'-di-ε-caproic acid or the ester derivatives thereof and a glycol.

It is a further object of this invention to provide a novel catalytic agent for use in the afore-mentioned process.

It is a still further object to provide a process for preparing polyesteramides of the just described class with a higher molecular weight.

Other objects will be apparent from the description and claims which follow.

In general, these objects are accomplished by conducting a condensation reaction between terephthalic acid diamide-N,N'-di-ε-caproic acid or dialkyl ester derivatives thereof with a glycol containing 2 to 10 carbon atoms in the presence of a catalytic amount of tetraphenyl tin.

The dialkyl ester derivatives referred to above are diesters formed from lower alcohols, such as methyl-, ethyl-, propyl-, butyl-, and amyl-alcohol as well as the corresponding mixed esters. The glycols employed are polymethylene glycols of the general formula $$HO(CH_2)_nOH$$

wherein $n$ is an integer of from 2 to 10. Ethylene glycol is of particular preference and hereinafter will be specifically mentioned when reference is made to glycols.

In the preparation of these polymers, the reactive intermediate, i.e., the di-glycol ester of terephthalic acid diamide-N,N'-di-ε-caproic acid must be first obtained and then polymerized. When employing the terephthalic acid diamide-N,N'-di-ε-caproic acid per se as a starting material, the polymer preparation is conducted in two stages, both in the presence of the catalytic agent tetraphenyl tin. In the first stage, the acid is reacted with an amount of ethylene glycol which exceeds the stoichiometric quantity to form the di-glycol ester of the acid. This monomer is then poly-condensed in the second stage reaction to form the polymer. The amount of ethylene glycol employed in this reaction is not critical beyond the requirement that at least more than a stoichiometric quantity be present. Generally, however, high proportions of the glycol relative to the esters or acids are used. For example, up to 10 times as many moles of glycol as ester or acid may be employed because the reaction takes place more readily in the presence of an exess of glycol.

The conditions necessary for these reactions are well known and will be readily understood by those skilled in the art. Thus, during the first stage in which the di-glycol ester is formed, the reaction is carried out at atmospheric pressure and at a temperature in the range of from about 175° to 195° C. and preferably between 180° and 190° C. At the completion of the first stage, the excess glycol is distilled off prior to entering the second stage of poly-condensation. Thereafter, in the second or polymerization stage the reactive intermediate, e.g., the bis-2-hydroxyethyl ester of terephthalic acid diamide-N,N'-di-ε-caproic acid is heated at a still higher temperature of from about 230° to 250° C. and under reduced pressure within the range of from 0.1 to 5 mm. of mercury to form the polymer. The second or polymerization step is continued, if a fiber-forming polymer is desired, until the reaction product has the desired degree of polymerization, which may be determined by viscosity measurements. Normally, high molecular weight polymers in the fiber-forming range can be obtained in from about 30 minutes to one hour of polymerization reaction time.

When employing the dialkyl esters of terephthalic acid diamide-N,N'-di-ε-caproic acid as a starting material, the procedural steps are essentially the same as outlined above. In the first stage, an ester-interchange reaction is conducted between ethylene glycol and the dialkyl ester, for example, the dimethyl ester of terephthalic acid diamide-N,N'-di-ε-caproic acid at normal pressures and a temperature of between 175° to 195° C. The di-glycol ester of terephthalic acid diamide-N,N'-di-ε-caproic acid is formed during this reaction together with methanol which is removed from the reaction zone. The second, or poly-condensation stage, is conducted at reduced pressures of from 0.1 to 5 mm. of mercury at a temperature in the range of from 230° to 250° C. Again, high molecular weight polymers can be obtained in from about 30 minutes to an hour.

As has been noted, the tetraphenyl tin catalyst is present in both the first and second reaction steps which have been described above. The amount of catalyst present may be widely varied and is not critical. All that is needed is a catalytic amount. For example, good results can be obtained with a catalyst concentration varying between 0.001 to 2.0 percent by weight based on the terephthalic acid diamide-N,N'-di-ε-caproic acid or the dialkyl ester derivatives thereof, with from about 0.1 to 1.0 percent being of preference.

Of course, as will be recognized by those skilled in the art, the reactive intermediate which is polymerized to obtain the polymer may be prepared separately from the polymer forming reaction and used at a later time. It may also be prepared by other means than discussed above, for example, by reacting terephthalic acid diamide-N,N'-di-ε-caproic acid with ethylene oxide. Usually, however, this intermediate is obtained in the manner described. Regardless of how the reactive intermediate is obtained, the polymerization reaction to form the polymer is greatly accelerated in the presence of the novel tetraphenyl tin catalyst of this invention.

To further illustrate the invention and the advantages thereof, the following examples are given, it being understood that they are intended to be illustrative only and not limitative. All given parts are by weight unless otherwise indicated. In each of the examples presented, specific viscosity measurements have been taken. These values are directly related to the degree of polymerization attained and the polymer molecular weight. Specific viscosity values in the range of from about 0.3 to about 0.6 represent fiber- and filament-forming polymers.

Specific viscosity, as employed herein, is represented by the formula $$N_{sp} = N_{Rel.} - 1$$

where $$N_{Rel.} = \frac{\text{Time of flow of the polymer solution in seconds}}{\text{Time of flow of the solvent in seconds}}$$

Viscosity determination on the polymer solutions and solvent are made by allowing said solutions and solvent to flow by gravity at 25° C. through a capillary tube. In all determinations, the polymer solutions contained 0.55 gms. of the polymer dissolved in 100 cc. of solvent consisting of a mixture containing 60 percent by weight of phenol and 40 percent by weight of tetrachloroethane.

*Example I*

This example illustrates the formation of a polymer from terephthalic acid diamide-N,N'-di-ε-caproic acid dimethyl ester by employing a representative catalyst of the prior practice, i.e., lead oxide.

35 parts of the dimethyl ester of terephthalic acid diamide-N,N'-di-ε-caproic acid, 15 parts of ethylene glycol and 0.2 part of yellow lead oxide were heated with stirring and in a nitrogen atmosphere to a temperature of between 190° and 200° C. for a period of about 45 minutes at which time the trans-esterification was complete. The resulting bis(2-hydroxyethyl) ester of terephthalic acid diamide-N,N'-di-ε-caproic acid was then heated to a temperature of between 230° to 240° C. at a reduced pressure of 0.2 mm. of mercury. These conditions were maintained for a period of four and one-half hours. The polymer recovered had a specific viscosity of 0.49 and was badly discolored.

*Example II*

This example illustrates the practice of this invention wherein terephthalic acid diamide-N,N'-di-ε-caproic acid dimethyl ester was used as a starting material.

35 parts of the dimethyl ester of terephthalic acid diamide-N,N'-di-ε-caproic acid, 20 parts of ethylene glycol and 0.7 part of tetraphenyl tin were heated at a temperature of from 186° to 190° C. at atmospheric pressure for two hours. During this trans-esterification reaction, methanol was continuously taken off over-head. The temperature was then raised to 240° to 245° C. in order to distill off excess glycol. The resulting bis(2-hydroxyethyl) ester of terephthalic acid diamide-N,N'-di-ε-caproic acid was then condensed with stirring at a temperature of from 240° to 245° C. and under a reduced pressure of 0.2 mm. of mercury. After permitting this poly-condensation reaction to run for two hours, a polymer was recovered which had a specific viscosity of 0.52.

*Example III*

This example illustrates the practice of this invention wherein terephthalic acid diamide-N,N'-di-ε-caproic acid per se was used as a starting material.

35 parts of terephthalic acid diamide-N,N'-di-ε-caproic acid, 70 parts of ethylene glycol and 0.35 part of tetraphenyl tin were heated at a temperature of between 182° and 190° C. at atmospheric pressure with stirring for 45 minutes. The reaction temperature was then raised to 245° C. in order to distill off the excess glycol. The resulting bis(2-hydroxyethyl) ester of terephthalic acid diamide-N,N'-di-ε-caproic acid was then heated to a temperature of from 240° to 245° C. at a reduced pressure of 0.2 mm. of mercury. After permitting the polycondensation reaction to continue for approximately 35 minutes, a polymer was recovered which had a specific viscosity of 0.72. Fibers were readily fabricated from the polymer by extruding a sample of the same through a conventional spinnerette. The spinning conditions employed were a melt temperature of 230° C., spinnerette temperature of 255° C. and an extrusion pressure of 215 p.s.i.g.

It is observed that in Example I above where a representative catalyst of the prior art was employed in the polymer preparation, four and one-half hours of reaction time in the finishing or polymer forming cycle were required to produce a polymer having a specific viscosity of 0.49. On the other hand, in Example II where the catalyst of this invention was employed, a polymer was recovered after two hours of reaction time with a specific viscosity value of 0.52 as determined under the identical conditions. The results obtained in Example III are even more impressive when compared with the prior practice in Example I, i.e., only 35 minutes were required in the finishing or poly-condensation to produce a polymer having a specific viscosity of 0.72.

The invention has been described in detail with particular reference to certain preferred embodiments thereof, but it will be understood that variations and modifications can be effected within the spirit and scope of the invention as described hereinabove and as defined in the appended claims.

We claim:

1. A process for preparing polyesteramides which comprises conducting a condensation reaction of a polymethylene glycol containing 2 to 10 carbon atoms with a compound selected from the group consisting of terephthalic acid diamide-N,N'-di-ε-caproic acid and the lower dialkyl esters thereof in the presence of a catalytic amount of tetraphenyl tin.

2. A process for producing polyesteramides which comprises conducting an ester-interchange between ethylene glycol and the dimethyl ester of terephthalic acid diamide-N,N'-di-ε-caproic acid to form the bis(2-hydroxyethyl) ester of terephthalic acid diamide-N,N'-di-ε-caproic acid and subsequently poly-condensing said bis(2-hydroxyethyl) ester of terephthalic acid diamide-N,N'-di-ε-caproic acid, both the ester-interchange and poly-condensation reactions being conducted in the presence of from 0.001 to 2.0 weight percent of tetraphenyl tin based on the weight of said dimethyl ester of terephthalic acid diamide-N,N'-di-ε-caproic acid.

3. A process for preparing the bis(2-hydroxyethyl) ester of terephthalic acid diamide-N,N'-di-ε-caproic acid comprising reacting ethylene glycol and terephthalic acid diamide-N,N'-di-ε-caproic acid together in the presence of from about 0.001 to 2.0 weight percent of tetraphenyl tin based on the weight of said terephthalic acid diamide-N,N'-di-ε-caproic acid reactant.

4. A process for preparing the bis(2-hydroxyethyl) ester of terephthalic acid diamide-N,N'-di-ε-caproic acid comprising reacting ethylene glycol and the dimethyl ester of terephthalic acid diamide-N,N'-di-ε-caproic acid together in the presence of from about 0.001 to 2.0 weight percent of tetraphenyl tin based on the weight of said dimethyl ester of terephthalic acid diamide-N,N'-di-ε-caproic acid.

5. A process for producing polyesteramides which comprises polymerizing the bis(2-hydroxyethyl) ester of terephthalic acid diamide-N,N'-di-ε-caproic acid in the presence of a catalytic amount of tetraphenyl tin.

6. A process for preparing polyesteramides which comprises the following steps in sequence: (1) causing a compound selected from the group consisting of terephthalic acid diamide-N,N'-di-ε-caproic acid and the dimethyl ester thereof to react with a quantity of ethylene glycol in excess of the stoichiometric amount at a temperature in the range of from 175° to 195° C., (2) thereafter continuing the reaction under poly-condensation conditions of a reduced pressure in the range of from 0.1 to 5 mm. of mercury and a temperature of from 230° to 250° C., with steps (1) and (2) being conducted in the presence of a catalytic amount of tetraphenyl tin.

7. A process for preparing polyesteramides which comprises the following steps in sequence: (1) causing terephthalic acid diamide-N,N'-di-ε-caproic acid to react with a quantity of ethylene glycol in excess of the stoichiometric amount at a temperature in the range of from 175° to 195° C., (2) thereafter continuing the reaction under poly-condensation conditions of a reduced pressure in the range of from 0.1 to 5 mm. of mercury and a temperature of from 230° to 250° C., with steps (1) and (2) being conducted in the presence of from 0.001 to 2.0 weight percent of tetraphenyl tin based on the weight of said terephthalic acid diamide-N,N'-di-ε-caproic acid reactant.

8. A process for preparing polyesteramides which comprises the following steps in sequence: (1) causing the dimethyl ester of terephthalic acid diamide-N,N'-di-ε-caproic acid to react with a quantity of ethylene glycol in excess of the stoichiometric amount at a temperature in the range of from 175° to 195° C., (2) thereafter continuing the reaction under poly-condensation conditions of a reduced pressure in the range of from 0.1 to 5 mm. of mercury and a temperature of from 230° to 250° C., with steps (1) and (2) being conducted in the presence of from 0.001 to 2.0 weight percent of tetraphenyl tin based on the weight of said terephthalic acid diamide-N,N'-di-ε-caproic acid reactant.

References Cited in the file of this patent

UNITED STATES PATENTS

| | | |
|---|---|---|
| 2,719,835 | Sublett | Oct. 4, 1955 |
| 2,901,466 | Kibler et al. | Aug. 25, 1959 |
| 2,924,586 | Lotz | Feb. 9, 1960 |
| 3,033,826 | Kibler et al. | May 8, 1962 |

FOREIGN PATENTS

| | | |
|---|---|---|
| 577,788 | Canada | June 16, 1959 |
| 524,969 | Belgium | Dec. 31, 1953 |